US012409091B2

(12) United States Patent
Cowan et al.

(10) Patent No.: US 12,409,091 B2
(45) Date of Patent: Sep. 9, 2025

(54) BODY BAG

(71) Applicant: GBUK Limited, Selby (GB)

(72) Inventors: Joseph Cowan, Selby (GB); Ross Allsopp, Selby (GB); Nicholas Scard, Selby (GB)

(73) Assignee: GBUK Limited, North Duffield (GB)

( * ) Notice: Subject to any disclaimer, the term of this patent is extended or adjusted under 35 U.S.C. 154(b) by 188 days.

(21) Appl. No.: 17/821,503

(22) Filed: Aug. 23, 2022

(65) Prior Publication Data

US 2023/0255847 A1 Aug. 17, 2023

(30) Foreign Application Priority Data

Feb. 17, 2022 (GB) ...................................... 2202136

(51) Int. Cl.
*A61G 17/06* (2006.01)
*A61G 17/007* (2006.01)

(52) U.S. Cl.
CPC ........... *A61G 17/06* (2013.01); *A61G 17/007* (2013.01)

(58) Field of Classification Search
CPC ... A61G 17/06; A61G 17/007; A61G 17/0136
See application file for complete search history.

(56) References Cited

U.S. PATENT DOCUMENTS 4,790,051 A * 12/1988 Knight ..................... A61G 1/01 383/61.3
6,004,034 A * 12/1999 Salam .................... A61G 17/06 493/243
9,486,380 B2 * 11/2016 Jensen .................... A61G 17/06
9,849,055 B2 * 12/2017 Vertsteylen .......... A61G 17/047
2003/0145443 A1 * 8/2003 Lee ........................ B29C 66/532 156/530
2005/0138783 A1 * 6/2005 Craig ..................... A61G 17/06 27/28
2007/0009185 A1 * 1/2007 Lee ........................ A61G 17/06 383/18
2007/0009187 A1 * 1/2007 Adamo ................ A61G 17/048 383/41
2009/0260203 A1 * 10/2009 Baumhauer .......... A61G 17/007 119/843
2010/0263178 A1 * 10/2010 Jensen ................... A61G 17/06 206/525

(Continued)

FOREIGN PATENT DOCUMENTS

CN 107374892 A * 11/2017 ............ A61G 17/06
DE 202023107489 U1 * 2/2024

(Continued)

OTHER PUBLICATIONS

Search Report dated Jun. 28, 2022, in GB Application No. GB2202136.4, filed Feb. 17, 2022.

*Primary Examiner* — William L Miller
(74) *Attorney, Agent, or Firm* — Dunlap Codding, P.C.

(57) ABSTRACT

A body bag includes an elongate base layer, an elongate top layer attached to the base layer to define an internal cavity, and an elongate flap provided in the top layer, wherein the flap is releasably securable to a fixed portion of the top layer. In addition, the base layer includes a low friction material disposed across at least a portion of an interiorly facing surface. Methods of manufacturing and using the body bag are also disclosed.

17 Claims, 13 Drawing Sheets

(56) References Cited

U.S. PATENT DOCUMENTS

| | | | | |
|---|---|---|---|---|
| 2011/0162178 | A1* | 7/2011 | Jensen | B63C 7/16 27/28 |
| 2013/0174392 | A1* | 7/2013 | Chua | A61G 17/06 112/475.08 |
| 2014/0259577 | A1* | 9/2014 | Richardson | A61G 17/06 27/28 |
| 2016/0101009 | A1 | 4/2016 | Newell et al. | |
| 2016/0176622 | A1* | 6/2016 | Vertsteylen | A61G 17/047 206/205 |
| 2018/0104127 | A1* | 4/2018 | Leheurteux | A61G 17/0136 |

FOREIGN PATENT DOCUMENTS

| | | | | | |
|---|---|---|---|---|---|
| EP | 3085350 | A1 | | 10/2016 | |
| GB | 2115690 | A | * | 9/1983 | A61G 1/01 |
| GB | 2476651 | A | * | 7/2011 | A61G 17/007 |
| JP | H0611732 | U | * | 2/1994 | |
| JP | 3150917 | U | * | 6/2009 | |
| JP | 3236270 | U | * | 2/2022 | |
| WO | 2009061850 | A1 | | 5/2009 | |

* cited by examiner

BODY BAG

CROSS REFERENCE TO RELATED APPLICATIONS/INCORPORATION BY REFERENCE

This application claims benefit under 35 USC § 119(a) of GB Application No. 2202136.4, filed Feb. 17, 2022. The entire contents of the above-referenced patent application(s) are hereby expressly incorporated herein by reference.

TECHNICAL FIELD

The present disclosure relates to a body bag such as a bag designed to contain and conceal a human body or corpse for storage and transportation.

BACKGROUND

Body bags are bags which are designed to store a human body after death. They are widely used in hospitals and other care settings to preserve the dignity of deceased patients as they are transported to or from the morgue. Body bags are also used by the military during conflict to contain the bodies of dead soldiers, as well as by government and other relief agencies following natural disasters.

Modern body bags are typically formed from a relatively thick, opaque but flexible plastic material. The material is typically non-porous, helping to prevent leakage of body fluids. Existing body bags typically have a full-length zipper which extends along the length of the bag. In certain body bags, the zipper is C-shaped or J-shaped to make it easier to open the bag widely enough to place a body in the bag, or to examine the body without having to remove it completely from the bag. Handles are often provided on the bag to facilitate lifting.

Body bags are usually single-use owing to hygiene concerns and to prevent cross-contamination and are typically incinerated after use. As a result of this, they are typically mass produced using cheap materials to reduce their cost, and consequently have a standard, uniform design with little variation.

Existing body bags are often difficult to use as a result of their design. Within hospitals, a minimum of four staff members are usually required to fit a body bag to a deceased patient. The zipper of the bag is opened, the bag is placed alongside the patient lengthwise and the patient then has to be log rolled over the side of the bag before sliding the rough plastic bag underneath the patient to manhandle them through the open flap and into the bag. This can injure staff members, particularly when handling bariatric patients. Manhandling can also cause post-death injury to the patient which is undignified and can affect the results of an autopsy.

DETAILED DESCRIPTION

Figure 1:
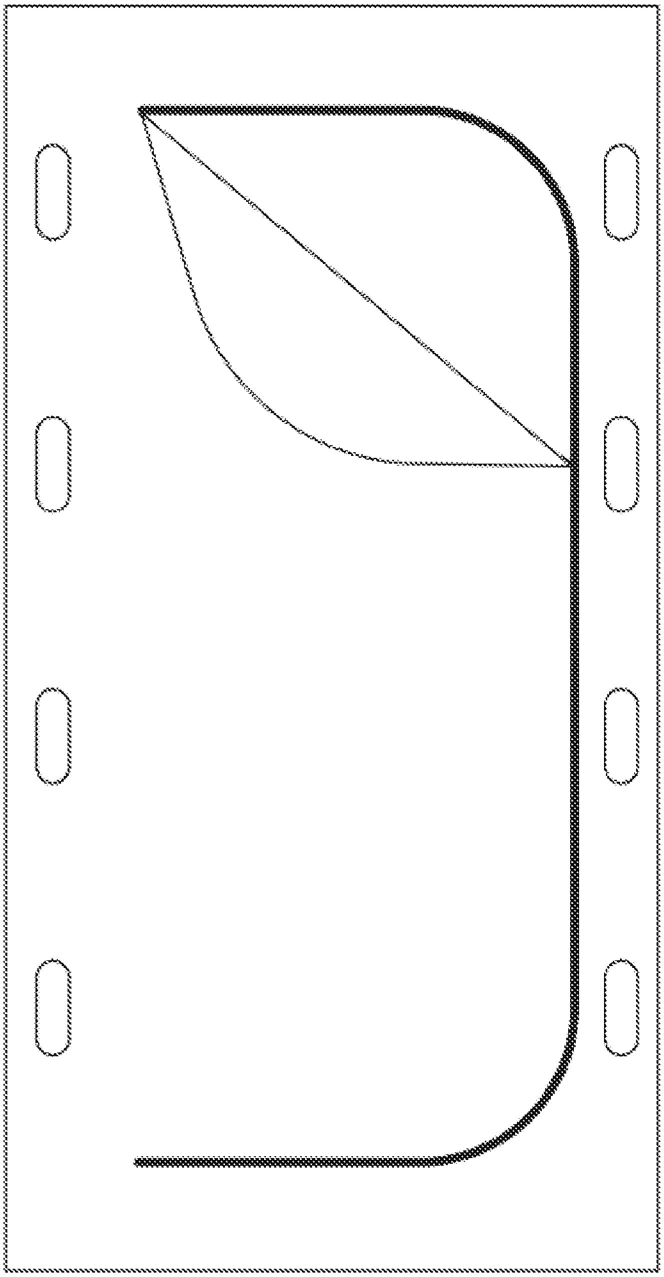
FIG. 1 (PRIOR ART)
FIG. 1 is provided for illustrative purposes only and is a top view of an existing (prior art) body bag.

The present disclosure seeks to provide a body bag which is quicker and easier to fit, requires fewer staff and less manhandling of deceased patients to provide more dignity and reduce the likelihood of staff injuries.

Viewed from a first non-limiting aspect, the present disclosure provides a body bag comprising: an elongate base layer having a head end, a foot end, and a longitudinal axis extending therebetween; an elongate top layer positioned adjacent to the base layer and attached to the base layer around a perimeter to define an internal cavity; and an elongate flap provided in the top layer, wherein the flap extends across a majority of the length and width of the top layer and is openable to access the internal cavity, wherein the flap is releasably securable to a fixed portion of the top layer; and wherein the base layer includes a low friction material disposed across at least a portion of an interiorly facing surface.

The low friction material facilitates the fitting of the bag by allowing it to be slid more easily underneath a patient's body from head to feet. This reduces the number of staff required to fit a body bag: in many cases only two staff are required to fit the bag, with one on each side of the patient's body. Only minimal contact between staff and the patient's body will be required, as once the bag is in position underneath the patient's head and shoulders, it can simply be slid underneath the body by pulling the bag from head to feet.

The low friction material is a material having a smooth and/or substantially frictionless surface which can easily be slid along other substrates such as cotton and polyester fabrics.

The flap may be releasably securable to a fixed portion of the top layer by a fastener along at least each longitudinal edge and a transverse edge towards the foot end, such that the flap is reversibly detachable from the fixed portion along each longitudinal edge and one transverse edge towards the foot end to be hinged from a second transverse edge towards the head end.

By providing a flap which hinges from a transverse edge rather than a longitudinal edge, the bag can advantageously be fitted to the patient's body lengthwise (i.e., in a longitudinal direction with respect to the body, from head to feet) rather than from the side. This eliminates the need to logroll or otherwise manhandle the patient's body into the bag from the side, thus reducing the risk of injury to both staff and the patient's body.

In certain non-limiting embodiments, the top layer is either stitched or welded to the base layer around the perimeter. In certain particular (but non-limiting) embodiments, the top layer is welded to the base layer around the perimeter.

The base layer may comprise a sheet of a first material with a low friction material provided as a coating on an internal facing surface. Alternatively, the base layer may comprise an external sheet composed of a first material, and a slide sheet attached to the external sheet between the external sheet and the top layer, wherein the slide sheet comprises the low friction material. The top layer may also be composed of the first material.

The first material may be a flexible non-woven material and is, in certain non-limiting embodiments, non-porous. In certain particular (but non-limiting) embodiments, the first material is a flexible, weldable, non-porous material. In a particular (but non-limiting) embodiment, the first material is a polyethylene vinyl acetate (PEVA) or a polyvinyl chloride (PVC).

Strip portions may be provided along each long edge of the slide sheet to facilitate attachment of the slide sheet to the external sheet and the top layer. In certain non-limiting embodiments, the strip portions are composed of the same material as the external sheet and the top layer. The strip portions may be stitched to the slide sheet.

In certain non-limiting embodiments, the strip portions are attached to the external sheet and the top layer by stitching or welding (e.g., high frequency welding). In certain particular (but non-limiting) embodiments, the strip portions are attached to the external sheet and the top layer by welding. This enables the external sheet, slide sheet and top layer to be welded together in a single manufacturing step.

The low friction material may be selected from a group consisting of polytetrafluoroethylene (PTFE), fluorinated ethylene propylene (FEP) and silicone. The low friction material may be a sheet which has been coated in a material to reduce its friction, e.g., a silicone coated polyester sheet. In certain non-limiting embodiments, the low friction material is silicone.

In certain non-limiting embodiments, the top layer and base layer have substantially the same length and width. The top and base layers may each have a length of between 190 cm and 250 cm. In certain non-limiting embodiments, the top and base layers each have a length of between 210 cm and 230 cm. The top and base layers may each have a width of between 80 cm and 160 cm. In certain non-limiting embodiments, the top and base layers each have a width of between 100 cm and 120 cm.

In certain non-limiting embodiments, the flap extends over a majority of the top layer. In certain particular (but non-limiting) embodiments, the flap has a width of at least 80% of the width of the top layer and a length of at least 75% of the length of the top layer. For example (but not by way of limitation), the flap may have a width of around 95% of the width of the top layer and around 85% of the length of the top layer.

The flap may have a maximum length of between 160 cm and 220 cm. In certain non-limiting embodiments, the flap has a maximum length of between 180 cm and 200 cm. The flap may have a maximum width of between 70 cm and 140 cm. In certain non-limiting embodiments, the flap has a maximum width of between 95 cm and 115 cm.

The fastener may be selected from a group consisting of a zip, multiple zips (i.e., a zip having two or more independently moveable sliders), hook and loop fasteners, one or more tie cords, buttons, and snap fasteners. In certain non-limiting embodiments, the fastener is a zip.

The fastener is disposed along at least each longitudinal edge and the foot end transverse edge of the flap. In certain non-limiting embodiments, the fastener is also disposed along a majority of the head end transverse edge to define a substantially circular or rectangular flap. Where the fastener is disposed along a majority of the head end transverse edge, in certain non-limiting embodiments, the fastener does not extend around one head end corner portion. Thus, the flap is not completely detachable from the top layer and is retained by the head end corner portion when the fastener is completely unfastened. When completely unfastened, the flap can be moved via the head end corner to enable access to the entire body within the bag for examination or identification. The fastener can also be partially unfastened in a particular region to enable access to a part of (e.g., the head) of the body as required.

In certain non-limiting embodiments, the flap has a generally rectangular or rounded rectangular shape.

The top layer or flap may include a document pouch on an outward facing surface.

The body bag may further comprise one or more handles provided at or towards the perimeter of the top and/or base layer. In certain non-limiting embodiments, the handles are provided at the top layer to facilitate access. The handles may be a separate material attached to the body bag, or may be integrally formed within the top and/or base layer.

The handles may be provided at or towards each longitudinal edge of the top layer. Further handles may be provided at or towards one or both of the head and foot ends of the body bag. The handles may comprise an elongate strip of webbing material attached along each longitudinal edge and optionally the head and/or foot ends of the top layer. In certain non-limiting embodiments, the webbing material along each longitudinal edge is stitched to the top layer at a plurality of longitudinally spaced points along the length of the body bag to define a plurality of grippable handles. Where present, the webbing material along the head and/or foot ends of the top layer is, in certain non-limiting embodiments, stitched to the top layer at a plurality of transversely spaced points across the width of the body bag to define a plurality of grippable handles.

Viewed from a second non-limiting aspect, the present disclosure provides a method of manufacturing a body bag as hereinbefore described, comprising: taking two similarly sized elongate sheets of a flexible, non-porous material; applying a low-friction coating to a first side of one sheet to form a base layer; cutting a flap into the second sheet of material; attaching a fastener between the flap and the second sheet of material to form a top layer; and attaching the top layer to the bottom layer around a perimeter.

The method may further comprise attaching one or more handles around the perimeter. The handles may be attached by stitching.

In certain non-limiting embodiments, the first and second sheets of material are composed of a weldable material, and in certain non-limiting embodiments, the top layer and the bottom layer are attached together by welding.

Viewed from a third non-limiting aspect, the present disclosure provides a method of manufacturing a body bag as hereinbefore described, comprising: taking two similarly sized elongate sheets of a flexible, non-porous material; cutting a flap into a first of the sheets of material and attaching a fastener between the flap and the first sheet of material to form a top layer, wherein the second sheet of material is a base layer; taking a slide sheet composed of a low friction material and having similar dimensions to the two sheets; attaching a strip portion composed of the flexible, non-porous material to each longitudinal edge of the slide sheet; arranging the slide sheet and strip portions between the top layer and the base layer; and attaching the top layer to the bottom layer around a perimeter and to the strip portions.

The strip portions may be attached to the slide sheet by stitching.

In certain non-limiting embodiments, the first and second sheets of material and the strip portions are composed of a weldable material, and in certain non-limiting embodiments, the top layer, bottom layer, and strip portions are attached together by welding.

The method may further comprise attaching one or more handles around the perimeter. The handles may be attached by stitching.

Viewed from a fourth non-limiting aspect, the present disclosure provides a method of fitting a body bag as hereinbefore described to a deceased patient, comprising: unfastening the fastener to release the flap on the foot end transverse edge and the longitudinal edges, opening the flap by folding the flap from the head end transverse edge; positioning the foot end of the body bag under the head and shoulders of a body in a supine position; pulling the foot end of the body bag downwards underneath the body towards the foot end to slide the body into the cavity; and fastening the flap.

A specific implementation of the present disclosure will now be described, by way of example only.

Figure 2:
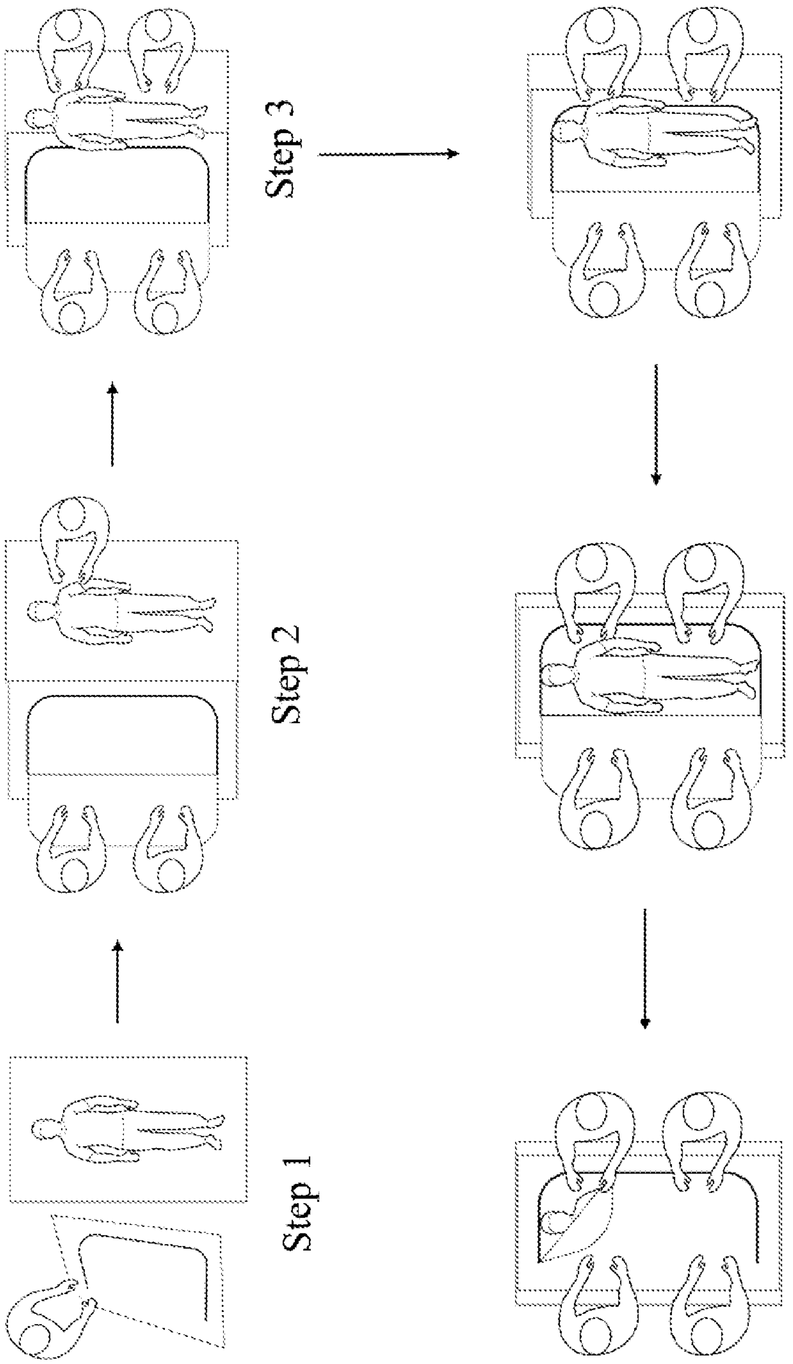
FIG. 2 (PRIOR ART)
FIG. 2 is provided for illustrative purposes only and shows a procedure for fitting the existing (prior art) body bag of FIG. 1.

Referring now to FIGS. 1 and 2, an illustrative example of an existing (prior art) body bag is shown. The existing body bag is made up of two sheets of non-porous material which are attached together around a perimeter, with handles formed in the perimeter. A C-shaped flap is provided in the uppermost sheet. The bag is fitted to a deceased patient by opening the flap (Step 1), positioning the bag alongside the patient (Step 2), log-rolling the patient's body sideways into the bag (Steps 3 and 4), fitting the bag around the patient (Step 5) and then closing the flap (Step 6). As shown in FIG. 2, this procedure requires at least four staff members and involves the difficult and undignified step of log rolling the patient's body into the bag.

Figure 3:
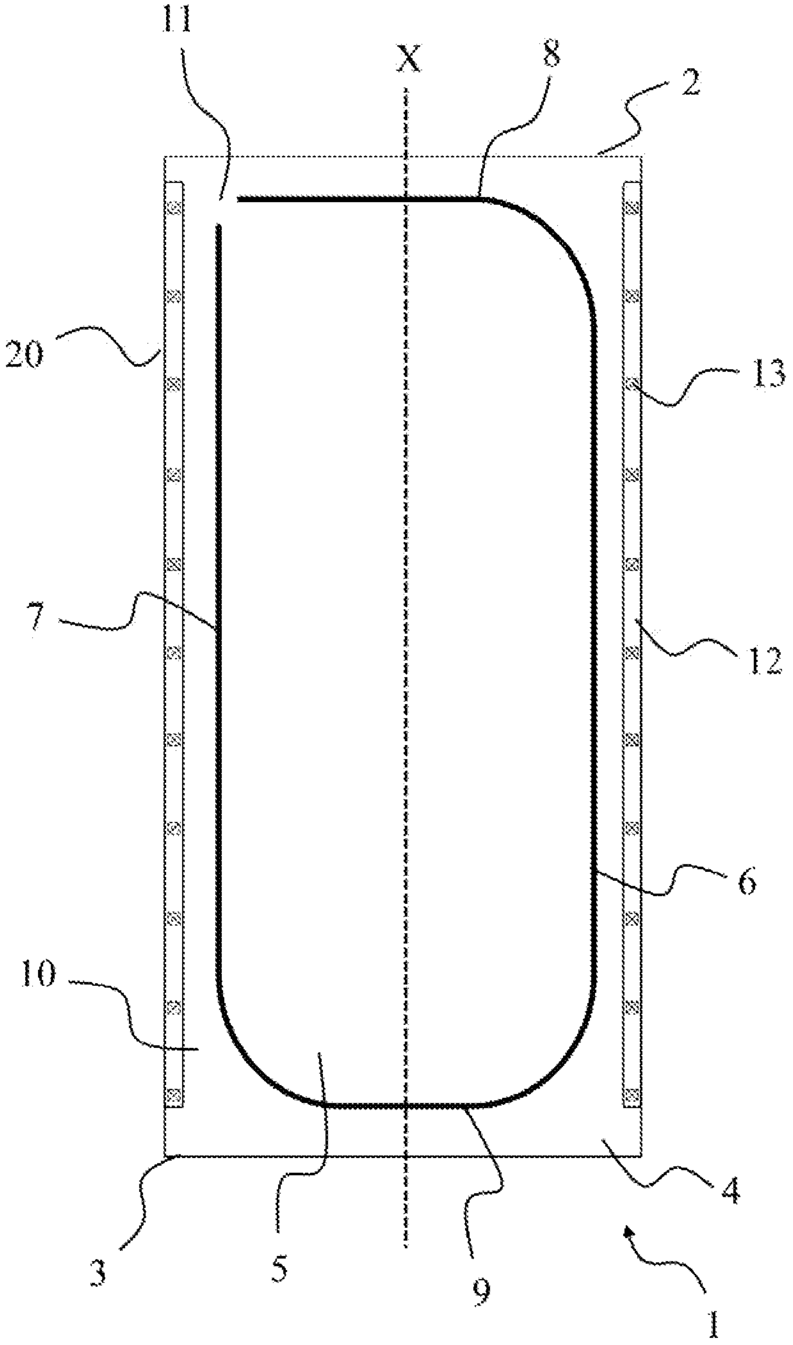
FIG. 3 is a top view of a body bag according to a first non-limiting embodiment of the present disclosure.

Referring now to FIG. 3, a body bag 1 according to the present disclosure is shown. The body bag 1 is elongate with a generally rectangular shape and has a head end 2, a foot end 3 and a longitudinal axis X. The body bag 1 has a top layer 4 and a base layer 15 (not visible in FIG. 1). The top layer 4 includes a flap 5 which covers a majority of the top layer 4, with a fixed portion 10 surrounding the flap 5. The flap 5 has a generally rounded rectangular shape and has a zip fastener 6 disposed around a majority of its perimeter including each longitudinal edge 7, the head end transverse edge 8 and the foot end transverse edge 9. The zip fastener 6 does not extend around one head end corner 11 of the flap 5. This ensures that the flap 5 remains attached to the rest of the body bag 1 when the zip fastener 6 is unfastened completely.

In this particular embodiment, the body bag 1 has a length of 220 cm and a width of 111 cm. The flap 5 has a maximum length of 190 cm and a maximum width of 105 cm.

Figure 8:
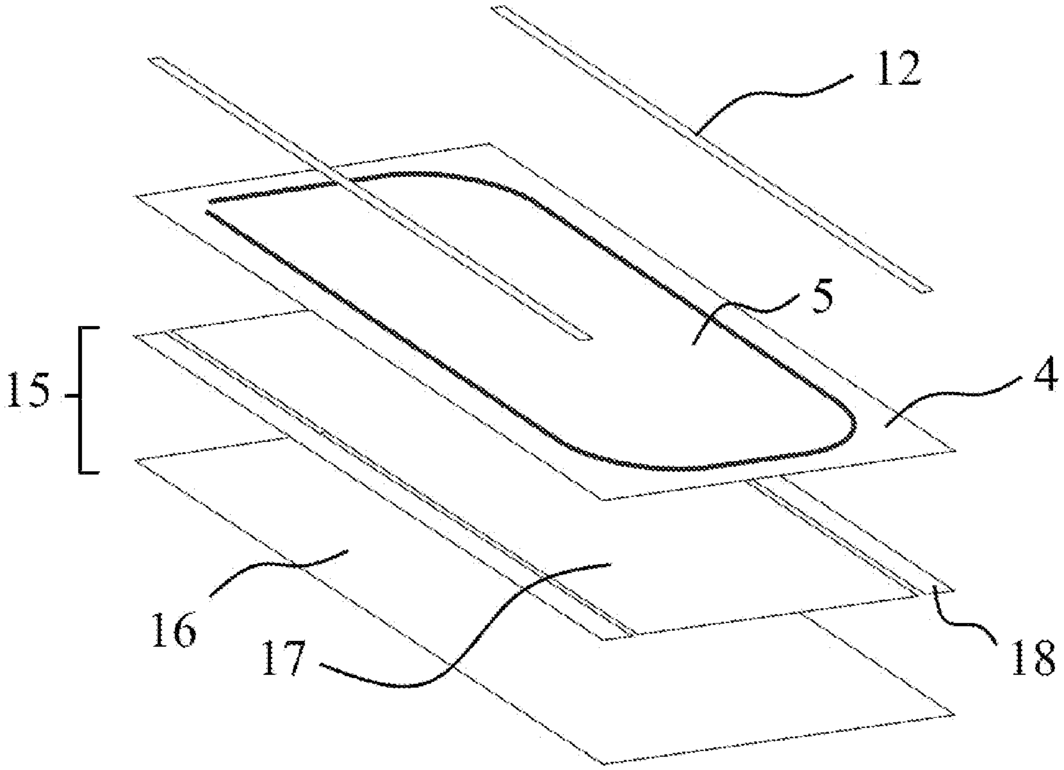
FIG. 8 is an exploded perspective view of the body bag of FIG. 3.

With reference now to FIG. 8, the base layer 15 includes a bottom sheet 16 and a slide sheet 17. The bottom sheet 16 is composed of the same material as the top layer 4. In this particular embodiment, the bottom sheet 16 and top layer 4 are composed of polyethylene vinyl acetate (PEVA). PEVA is advantageously weldable which allows the top layer 4 and base layer 15 to be joined around a perimeter 20 by welding. In this particular embodiment the slide sheet 17 has a length of 210 cm and a width of 95 cm.

In this embodiment, the slide sheet 17 is composed of silicone. As silicone is not weldable, a side strip 18 is stitched along each longitudinal edge 7 of the slide sheet 17. The side strips 18 are composed of PEVA which advantageously enables the top layer 4, the slide sheet layer (the slide sheet 17 and side strips 18) and the bottom sheet 16 to be joined in a single welding step. The side strips 18 each have a length of 220 cm and a width of 8 cm.

Referring again to FIG. 3, the body bag 1 includes a strip of webbing material 12 extending along each longitudinal edge 7 of the top layer 4. The webbing material 12 is stitched to the top layer 4 at a series of evenly spaced attachment points 13 along its length to define a set of handles along each longitudinal side of the body bag 1.

Figure 4:
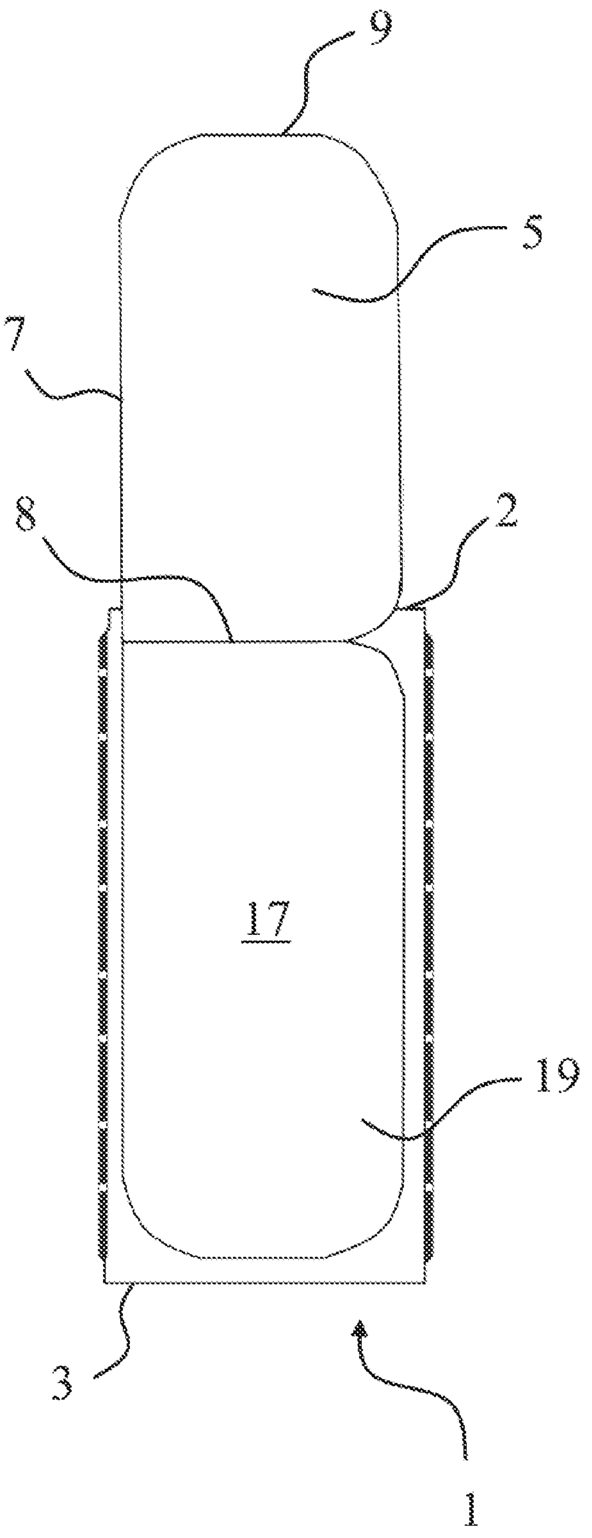
FIG. 4 is a top view of the body bag of FIG. 3 with the flap fully opened in a loading/unloading position.

FIG. 4 shows the body bag 1 with the flap 5 in an open loading position. In the open loading position, the zip fastener 6 has been unfastened along each longitudinal edge 7 and the foot end transverse edge 9 of the flap 5. The flap 5 has been folded back along the head end transverse edge 8 to reveal the slide sheet 17 and a cavity 19 within the body bag 1. In this configuration, the body bag 1 is ready to be fitted to the body 21 of a patient.

Figure 9:
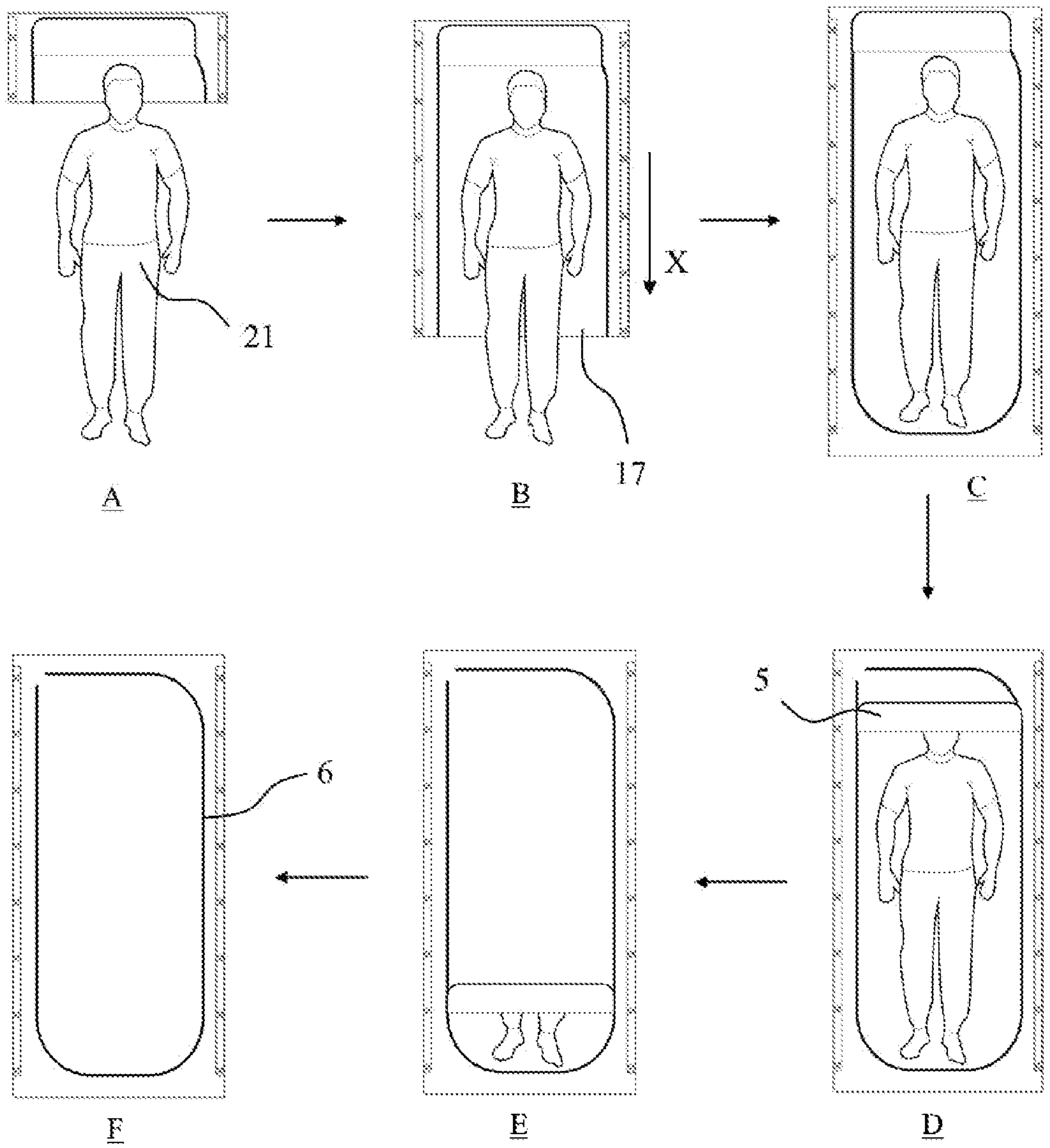
FIG. 9 shows a procedure for fitting the body bag of FIG. 3.

With reference to FIG. 9, the process of fitting the body bag 1 to a body 21 is shown. With the body bag 1 in the configuration shown in FIG. 4, the body bag 1 is folded several times width-wise and then placed under the head and shoulders of a body 21 in a supine position (step A). Two operatives (one stood either side of the body 21) then pull the body bag 1 in a longitudinal direction X underneath the body 21 in several steps to gradually unfold the body bag 1 underneath the body 21 (step B). The slide sheet 17 significantly reduces friction between the body 21 and the body bag 1 during fitting and enables the body bag 1 to be slid underneath the body 21 without needing to roll or manhandle the body 21. This reduces the risk of injury to staff and the body 21 and reduces the number of staff required to fit the body bag 1.

Once the body bag 1 has been pulled underneath the body 21, the fixed portion 10 of the top layer 4 can be arranged around the body 21 to ensure that the body 21 is positioned within the cavity 19 of the body bag 1 (step C). The flap 5 can be closed using the zip fastener 6 (steps D to F) and the body bag 1 can be moved using the webbing strip 12 handles.

The zip fastener 6 in this particular embodiment is a two-way zip fastener. This advantageously enables any portion of the flap 5 to be opened as required. Whilst a full autopsy will require removal of the body bag 1, pathologists and others may need to briefly inspect or examine part or all of the body 21. In these cases, it would be unnecessary and time consuming to remove the body bag 1.

Figure 5:
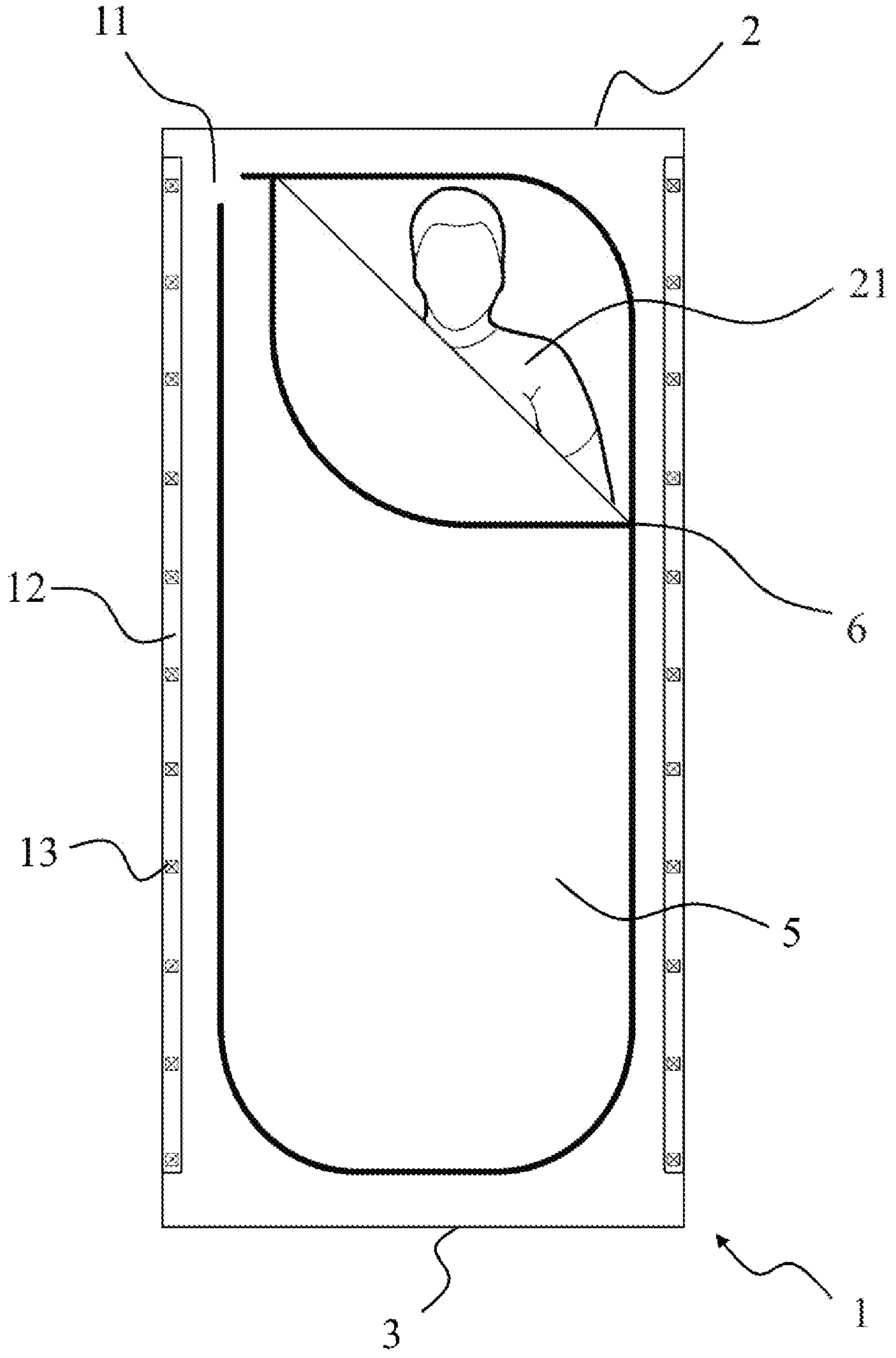
FIG. 5 is a top view of the body bag of FIG. 3 with the flap partially opened in a head end examination position.

For example (but not by way of limitation), as shown in FIG. 5, the zip fastener 6 can be unfastened only at the head transverse end 8 of the flap 5 and partially along one longitudinal edge 7 of the flap 5. This allows the head of the body 21 to be viewed (e.g., for identification) or examined.

Figure 6:
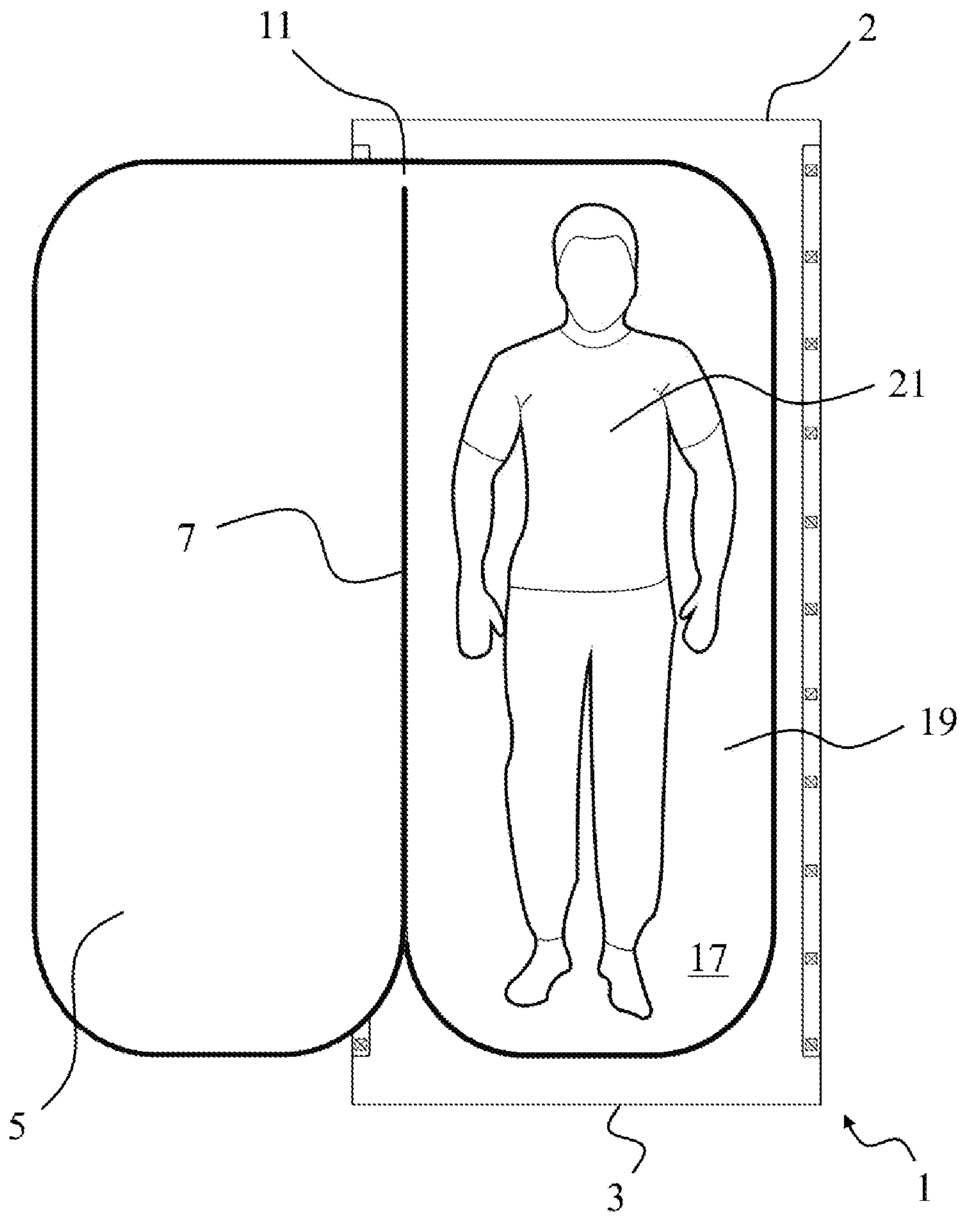
FIG. 6 is a top view of the body bag of FIG. 3 with the flap fully opened in an examination position.
Figure 7:
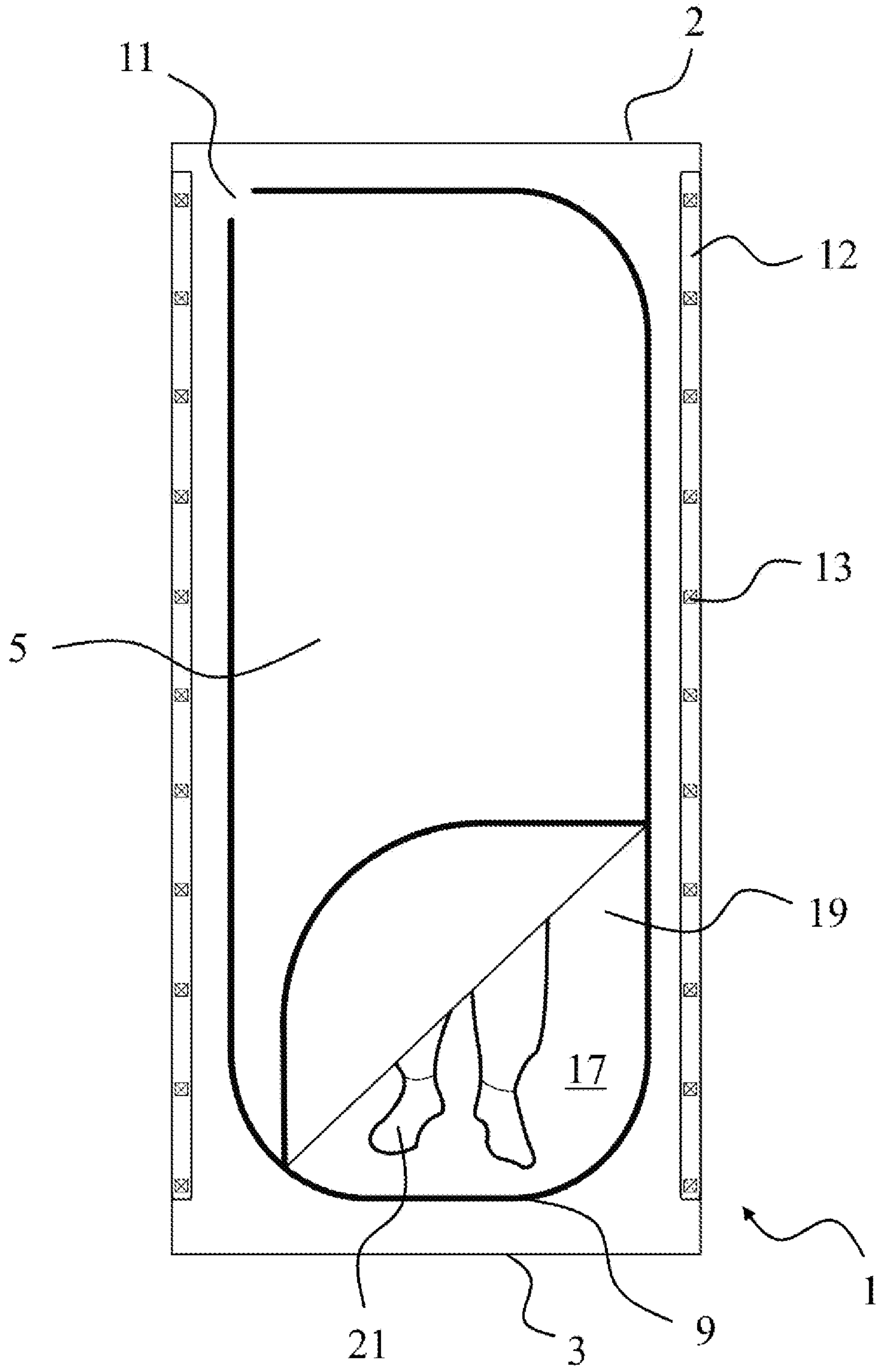
FIG. 7 is a top view of the body bag of FIG. 3 with the flap partially opened in a foot end examination position.

As shown in FIG. 6, the flap 5 can be unfastened along both transverse edges 8, 9 and one longitudinal edge 7 to allow the full body 21 within the body bag 1 to be viewed or examined. FIG. 7 shows yet another flap configuration where the flap 5 is unfastened along the foot end transverse edge 9 and part of one longitudinal edge 7 to allow the feet of the body 21 (or any attached identification tags or labels) to be viewed or examined.

With reference again to FIG. 8, the body bag 1 is assembled by taking an elongate slide sheet 17 composed of silicone stitching PEVA side strips 18 along each longitudinal edge of the slide sheet 17. A flap 5 is cut into a sheet of PEVA material and the zip fastener 6 is attached around the flap 5 to form the top layer 4. A second sheet of PEVA material 16 is positioned underneath and aligned with the slide sheet 17 and side strips 18, with the top layer 4 positioned above. The three layers are then welded together around the perimeter 20. Webbing strips 12 are then stitched at attachment points 13 to each longitudinal edge of the top layer 4. In this particular embodiment, each webbing strip 12 is attached at eleven attachment points 13 to define ten handles along each longitudinal edge of the top layer 4.

Figure 10:
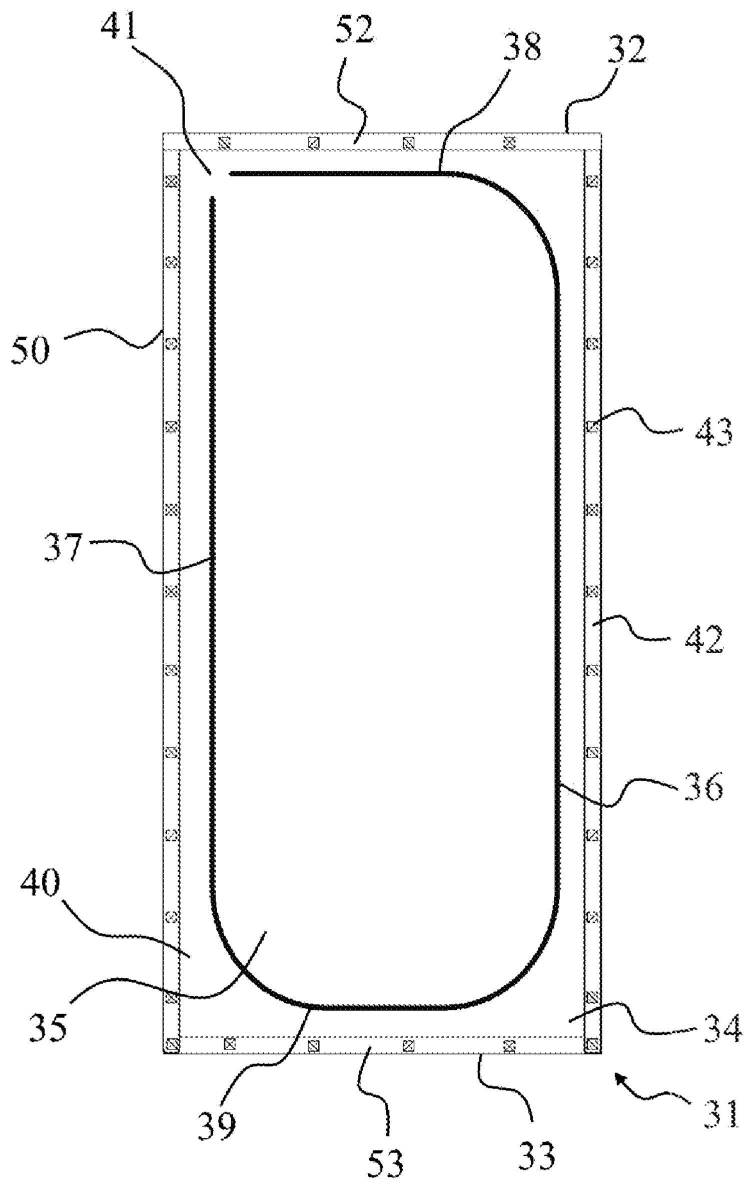
FIG. 10 is a top view of a body bag according to a second non-limiting embodiment of the present disclosure.

Referring now to FIG. 10, an alternative body bag 31 according to the present disclosure is shown. The body bag 31 is similar to the body bag 1: it is elongate with a generally rectangular shape and has a head end 32 and a foot end 33. The body bag 31 has a top layer 34 and a base layer (not visible). The laminar structure of the body bag 31 is the same as the structure shown in FIG. 8 for the body bag 1, including a silicone slide sheet and side strips. The top layer 34 includes a flap 35 which covers a majority of the top layer 34, with a fixed portion 40 surrounding the flap 35. The flap 35 has a generally rounded rectangular shape and has a zip fastener 36 disposed around a majority of its perimeter including each longitudinal edge 37, the head end transverse edge 38 and the foot end transverse edge 39. The zip fastener 36 does not extend around one head end corner 41 of the flap 35. This ensures that the flap 35 remains attached to the rest of the body bag 31 when the zip fastener 36 is unfastened completely. The body bag 31 can be used and fitted in the same manner as the body bag 1.

The body bag 31 includes a strip of webbing material 42 extending along each longitudinal edge 37 of the top layer 34. The webbing material 42 is stitched to the top layer 34 at a series of evenly spaced attachment points 43 along its length to define a set of handles along each longitudinal side of the body bag 31. In addition to the webbing material 42, the body bag also has two further strips of webbing material 52, 53 provided at the head end 32 and the foot end 33 respectively. The body bag 1 thus has handles provided around the entire perimeter 50 of the top layer 34. This is particularly advantageous for bariatric use, where additional gripping points may be required in order to move the bag 31 when loaded.

Figure 11:
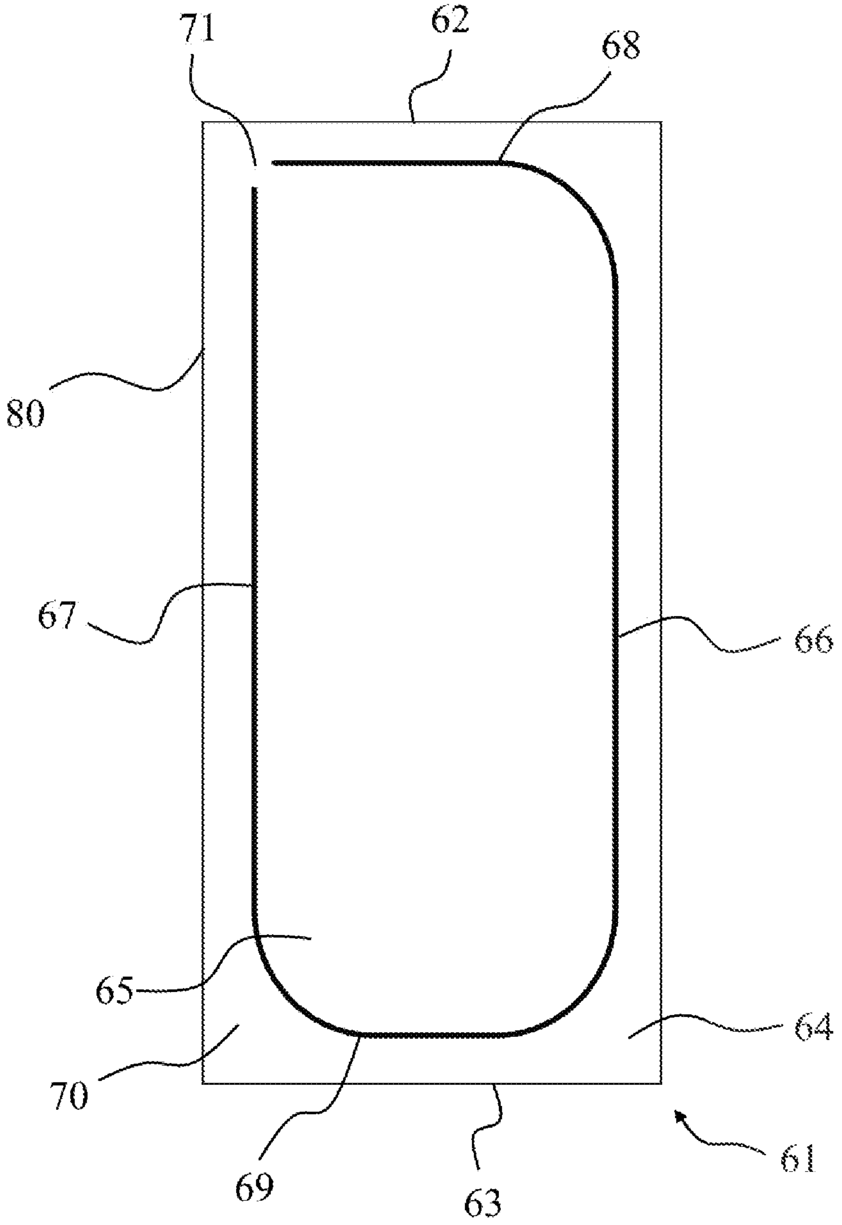
FIG. 11 is a top view of a body bag according to a third non-limiting embodiment of the present disclosure.

Referring now to FIG. 11, an alternative body bag 61 according to the present disclosure is shown. The body bag 61 is similar to the body bag 1: it is elongate with a generally rectangular shape and has a head end 62 and a foot end 63. The body bag 61 has a top layer 64 and a base layer (not visible). The laminar structure of the body bag 61 is the same as the structure shown in FIG. 8 for the body bag 1, including a silicone slide sheet and side strips. The top layer 64 includes a flap 65 which covers a majority of the top layer 64, with a fixed portion 70 surrounding the flap 65. The flap 65 has a generally rounded rectangular shape and has a zip fastener 66 disposed around a majority of its perimeter including each longitudinal edge 67, the head end transverse edge 68 and the foot end transverse edge 69. The zip fastener 66 does not extend around one head end corner 71 of the flap 65. This ensures that the flap 65 remains attached to the rest of the body bag 61 when the zip fastener 66 is unfastened completely. The body bag 61 can be used and fitted in the same manner as the body bag 1.

Unlike the body bags 1 and 31, the body bag 61 is not provided with any handles. To move the bag when loaded, users would grip onto the top layer 64 itself. The exclusion of handles makes the body bag 61 easier and cheaper to manufacture, meaning it is more suited to mass production and high volume, single use application.

Figure 12:
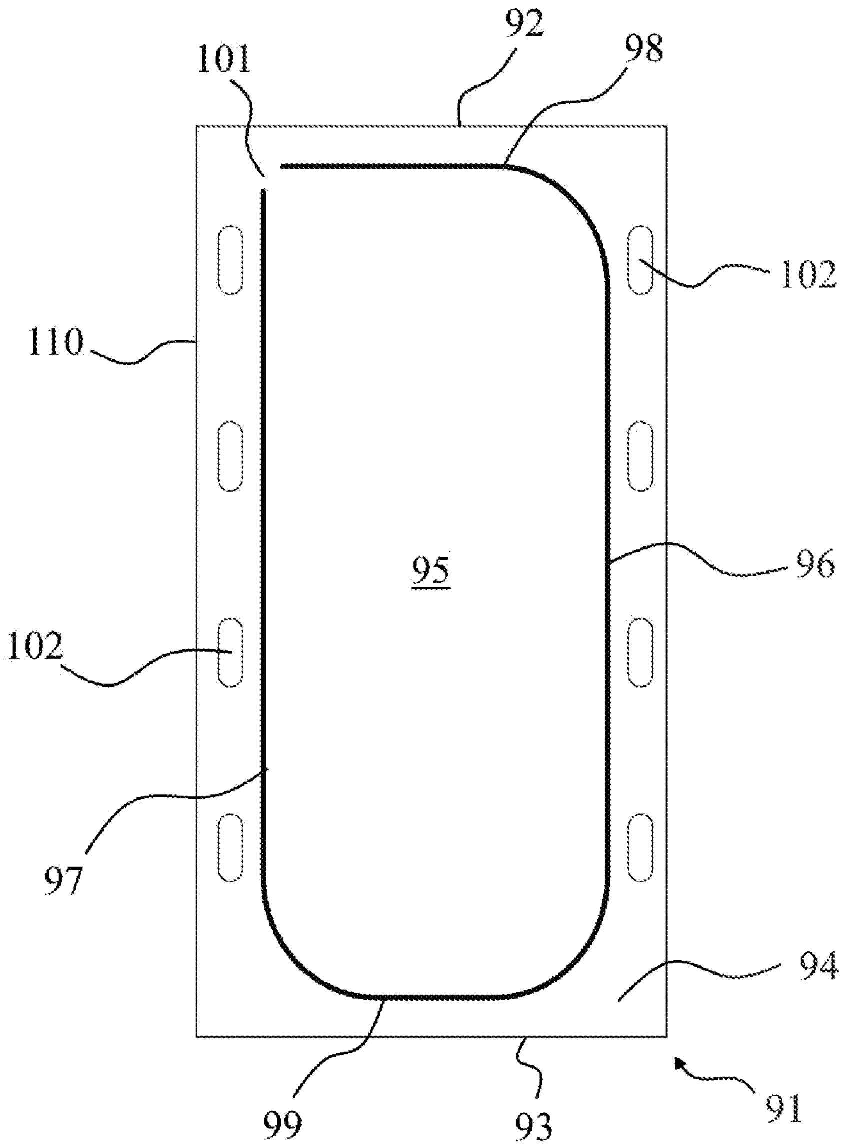
FIG. 12 is a top view of a body bag according to a fourth non-limiting embodiment of the present disclosure.

Referring now to FIG. 12, an alternative body bag 91 according to the present disclosure is shown. The body bag 91 is similar to the body bag 1: it is elongate with a generally rectangular shape and has a head end 92 and a foot end 93. The body bag 91 has a top layer 94 and a base layer (not visible). The laminar structure of the body bag 91 is the same as the structure shown in FIG. 8 for the body bag 1, including a silicone slide sheet and side strips. The top layer 94 includes a flap 95 which covers a majority of the top layer 94, with a fixed portion 100 surrounding the flap 95. The flap 95 has a generally rounded rectangular shape and has a zip fastener 96 disposed around a majority of its perimeter including each longitudinal edge 97, the head end transverse edge 98 and the foot end transverse edge 99. The zip fastener 96 does not extend around one head end corner 101 of the flap 95. This ensures that the flap 95 remains attached to the rest of the body bag 91 when the zip fastener 96 is unfastened completely.

The body bag 91 is provided with handles 102 which are integrally formed within the top layer 94 and the base layer as cut-out holes through the body bag 91. The top 94 and base layers are welded together around the handles 102 to allow the body bag 91 to be gripped and moved when loaded. The welded top and base sheets also seal the internal cavity.

Figure 13:
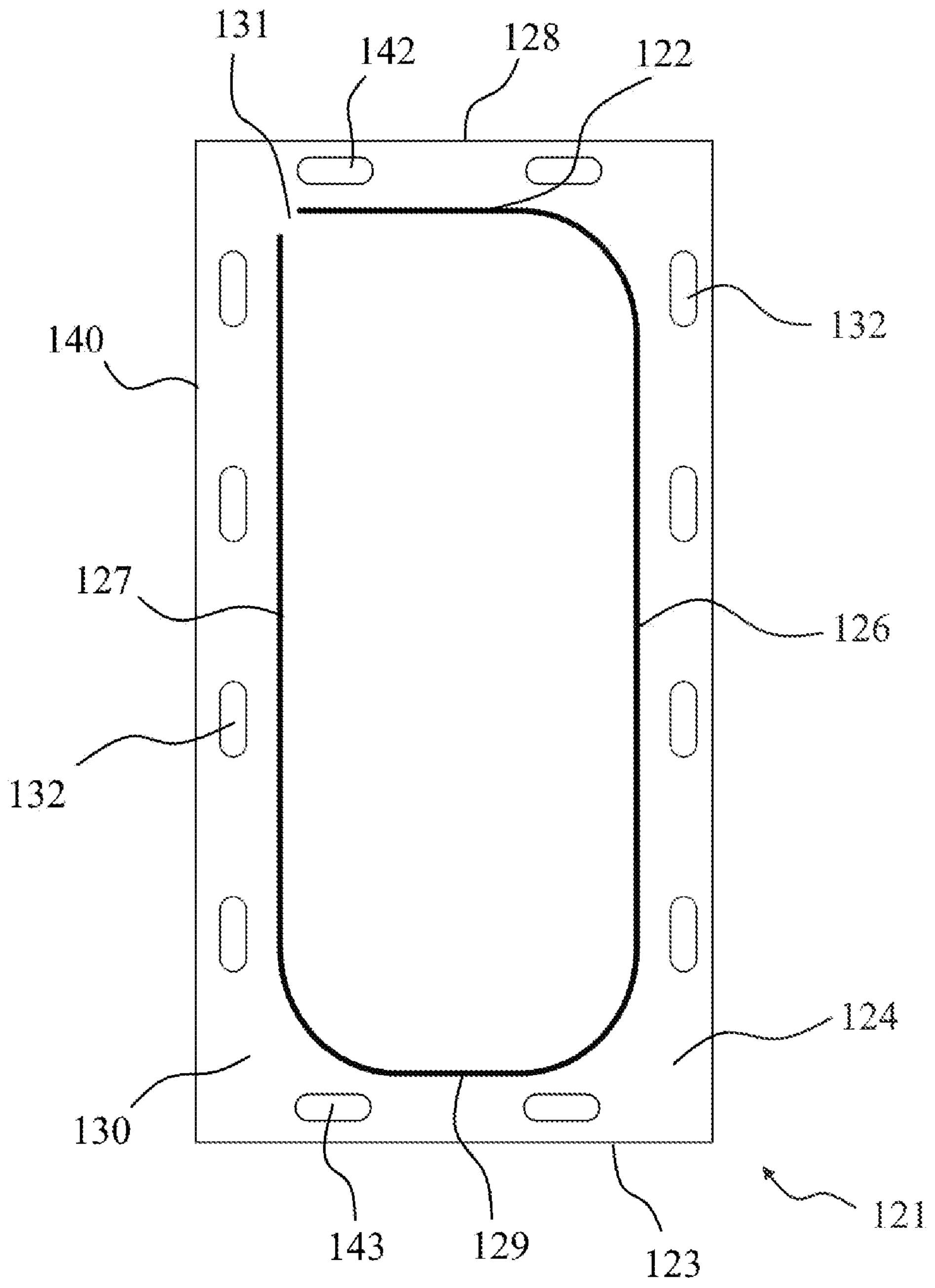
FIG. 13 is a top view of a body bag according to a fifth non-limiting embodiment of the present disclosure.

Referring to FIG. 13, a body bag 121 is shown. The body bag 121 is similar in structure to the body bag 91 (like features are numbered as the body bag 91 plus thirty). However, the body bag 121 includes a head end set of handles 142 and a foot end set of handles 143. The handles 142, 143 are integrally formed within the top layer 124 and the base layer as cut out holes through the body bag 121. Thus, as with the body bag 31, the body bag 121 has handles provided around the entire perimeter 140 of the top layer 124. This is particularly advantageous for bariatric use, where additional gripping points may be required in order to move the bag 121 when loaded.

What is claimed is:

1. A body bag, comprising:

an elongate base layer having a head end, a foot end, and a longitudinal axis extending therebetween, wherein the base layer includes a low friction material disposed across at least a portion of an interiorly facing surface;

an elongate top layer positioned adjacent to the base layer and attached to the base layer around a perimeter to define an internal cavity; and an elongate flap provided in the top layer, wherein the flap extends across a majority of the length and width of the top layer and is openable to access the internal cavity, and wherein the flap is releasably securable to a fixed portion of the top layer by a fastener along at least each longitudinal edge of the flap and a transverse edge of the flap towards the foot end, such that the flap is reversibly detachable from the fixed portion along at least a majority of each longitudinal edge and the transverse edge towards the foot end to be hinged from a transverse edge of the flap towards the head end.

2. The body bag of claim 1, wherein the base layer is welded to the top layer around the perimeter.

3. The body bag of claim 1, wherein the base layer comprises a sheet of a first material with the low friction material provided as a coating on an internal facing surface.

4. The body bag of claim 1, wherein the base layer comprises an elongate bottom sheet, and a slide sheet composed of the low friction material positioned between and attached to the bottom sheet and the top layer.

5. The body bag of claim 4, wherein the top layer and bottom sheet are composed of a weldable material, and the body bag further comprises side strips of weldable material attached to each longitudinal edge of the slide sheet, and wherein the top layer, the side strips and the bottom sheet are welded together.

6. The body bag of claim 1, wherein the low friction material is selected from a group consisting of polytetrafluoroethylene (PTFE), fluorinated ethylene propylene (FEP) and silicone.

7. The body bag of claim 1, wherein the flap extends over at least 80% of the width of the top layer and at least 75% of the length of the top layer.

8. The body bag of claim 1, wherein the fastener is a zip fastener having two or more sliders.

9. The body bag of claim 1, wherein the flap has a generally rectangular or rounded rectangular shape, and the fastener is disposed along each longitudinal edge of the flap, the foot end transverse edge of the flap, and a majority of the head end transverse edge of the flap and does not extend over one head end corner portion.

10. The body bag of claim 1, further comprising one or more handles attached at or towards the perimeter of the top layer.

11. A method for manufacturing the body bag of claim 1, the method comprising the steps of:

obtaining two similarly sized elongate sheets of a flexible, non-porous material;

cutting the flap into a first of the two sheets of material and attaching the fastener between the flap and the first sheet of material to form the top layer, wherein the second sheet of material is the base layer;

taking a slide sheet composed of the low friction material and having similar dimensions to the two sheets;

attaching a strip portion composed of the flexible, non-porous material to each longitudinal edge of the slide sheet;

arranging the slide sheet and strip portions between the top layer and the base layer; and attaching the top layer to the base layer around a perimeter and to the strip portions.

12. The method of claim 11, wherein the strip portions are attached to the slide sheet by stitching.

13. The method of claim 11, wherein the first and second sheets of material and the strip portions are composed of a weldable material, and the top layer, base layer and strip portions are attached together by welding.

14. The method of claim 11, further comprising attaching one or more handles around the perimeter.

15. A method of fitting the body bag of claim 1 to a deceased patient, the method comprising the steps of:

unfastening the fastener to release the flap on the foot end transverse edge and the longitudinal edges;

opening the flap by folding the flap from the head end transverse edge;

positioning the foot end of the body bag under the head and shoulders of the deceased patient in a supine position;

pulling the foot end of the body bag downwards underneath the deceased patient towards the foot end to slide the deceased patient into the cavity; and fastening the flap.

16. A body bag, comprising:

an elongate base layer having a head end, a foot end, and a longitudinal axis extending therebetween, wherein the base layer includes a low friction material disposed across at least a portion of an interiorly facing surface;

an elongate top layer positioned adjacent to the base layer and attached to the base layer around a perimeter to define an internal cavity; and an elongate flap provided in the top layer, wherein the flap extends across a majority of the length and width of the top layer and is openable to access the internal cavity, and wherein the flap is releasably securable to a fixed portion of the top layer by a fastener, and wherein the flap has a generally rectangular or rounded rectangular shape, and the fastener is disposed along at least a majority of each longitudinal edge of the flap, a foot end transverse edge of the flap, and a majority of a head end transverse edge of the flap and does not extend over one head end corner portion.

17. A method of fitting a body bag to a deceased patient, the method comprising the steps of:

providing the body bag comprising:

an elongate base layer having a head end, a foot end, and a longitudinal axis extending therebetween, wherein the base layer includes a low friction material disposed across at least a portion of an interiorly facing surface;

an elongate top layer positioned adjacent to the base layer and attached to the base layer around a perimeter to define an internal cavity; and an elongate flap provided in the top layer, wherein the flap extends across a majority of the length and width of the top layer and is openable to access the internal cavity, and wherein the flap is releasably securable to a fixed portion of the top layer by a fastener;

unfastening the fastener to release the flap on a foot end transverse edge and each longitudinal edge;

opening the flap by folding the flap from a head end transverse edge;

positioning the foot end of the body bag under the head and shoulders of the deceased patient in a supine position;

pulling the foot end of the body bag downwards underneath the deceased patient towards the foot end to slide the deceased patient into the cavity; and fastening the flap.

* * * * *